Figure 1:
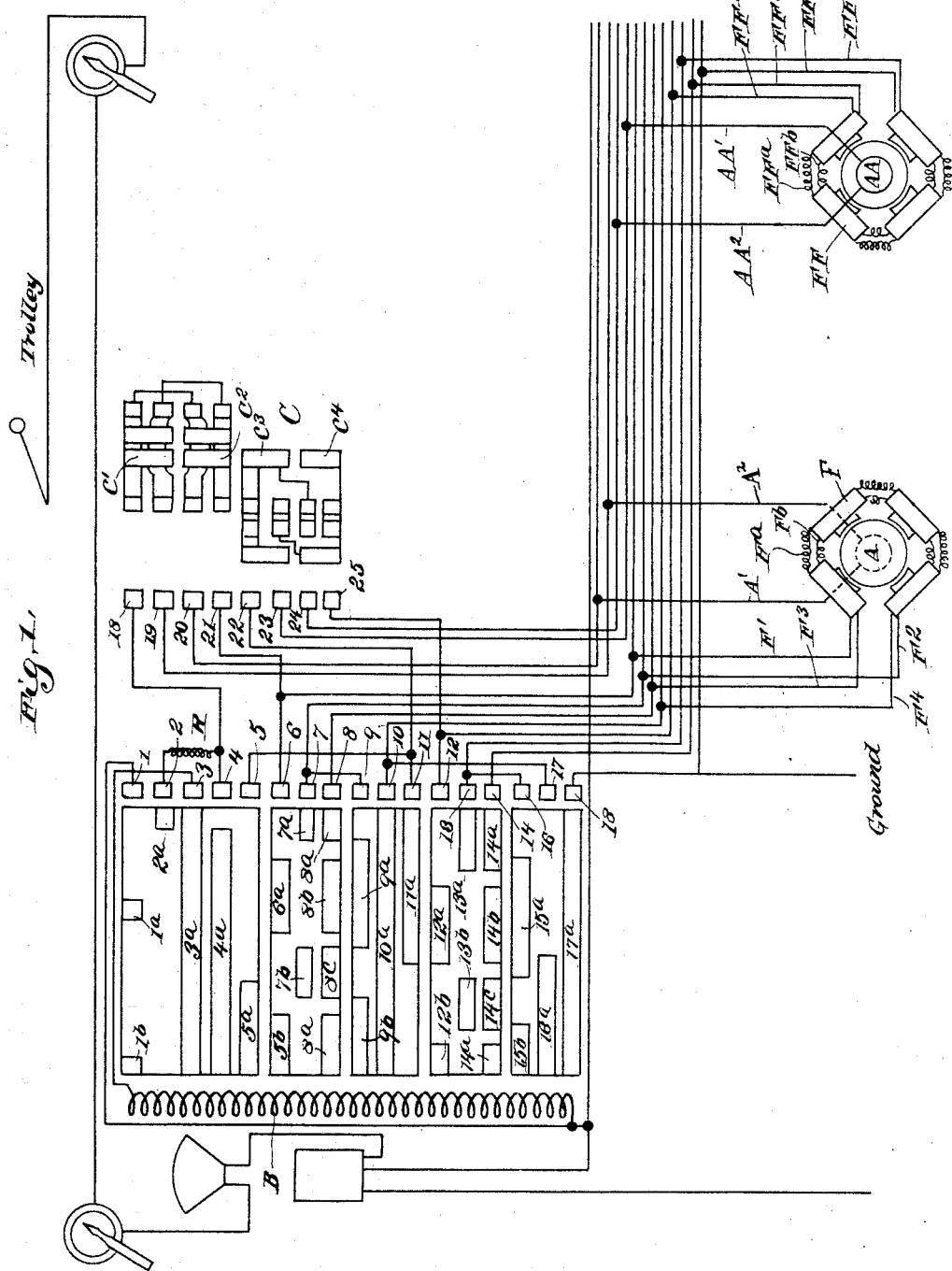

No. 618,163. Patented Jan. 24, 1899.
W. M. BROWN.
ELECTRIC MOTOR CONTROL.
(Application filed Oct. 7, 1898.)

(No Model.) 2 Sheets—Sheet 1.

Witnesses: Inventor:

No. 618,163. Patented Jan. 24, 1899.
W. M. BROWN.
ELECTRIC MOTOR CONTROL.
(Application filed Oct. 7, 1898.)
(No Model.) 2 Sheets—Sheet 2

WITNESSES:
INVENTOR
W. Milt. Brown
BY
Richard Eyre
ATTORNEY.

UNITED STATES PATENT OFFICE.

WILLIAM MILT. BROWN, OF JOHNSTOWN, PENNSYLVANIA, ASSIGNOR TO THE STEEL MOTOR COMPANY, OF OHIO.

ELECTRIC-MOTOR CONTROL.

SPECIFICATION forming part of Letters Patent No. 618,163, dated January 24, 1899.

Application filed October 7, 1898. Serial No. 692,899. (No model.)

*To all whom it may concern:*

Be it known that I, WILLIAM MILTON BROWN, of Johnstown, in the county of Cambria and State of Pennsylvania, have invented a new and useful Improvement in Electric-Motor Control, of which the following is a full, clear, and exact description, reference being had to the accompanying drawings, which form a part of this specification.

My invention relates to electric systems of control for operating two motors, and has for its general object an improved method and apparatus for accelerating the motors and regulating the speed thereof in which the motor-circuits are utilized so far as possible to gradate the current flow and rate of acceleration, whereby as little as possible of the energy taken from the line shall be dissipated in wasteful external resistances.

My invention is especially designed for railway-motors, although applicable to other uses.

In practicing my invention I provide a plurality of electric motors—two in the present instance—and I wind the fields thereof with duplicate windings, so that I may vary the resistance of the field-coils and field strength by commutating the duplicate windings. I provide switches by the movement of which I may effect gradual acceleration in the speed of the motors by varying in successive steps the field strength and ohmic resistance of one motor without changing that of the other. Having lowered the field strength and ohmic resistance of one motor, I then pass through the same steps with the second motor. Larger changes of speed I obtain by making series-multiple changes of the motors as a whole, so that the central feature of my invention is that the smaller changes in speed, both in moving through the series and parallel positions, are made by the circuit changes of the field of first one motor and then the other.

Heretofore the controllers most generally used combine series-multiple changes with successive steps in which external resistances are inserted or removed. It has been, however, proposed to employ the circuit changes of the coils of the motors themselves to effect the necessary changes, but such proposed forms have generally been faulty in that they do not provide sufficiently small gradations of speed and in that they make changes of the motor-circuits which are too complicated and effect too sudden and serious reactions upon the motors. By my improved method, as hereinbefore outlined, I am enabled to obviate this difficulty, as I at no time make too abrupt a change in the motor-circuit or one that will do any damage to the motors, and I am able to provide a simple form of apparatus in which a gradual acceleration of the motors is attained by the movement of a single operating-lever and by which a number of speed regulations may be gained in which no power is wasted in external resistances.

My invention therefore consists in the improved method which I have already outlined and to be more fully described hereinafter and in the improved arrangement, construction, and combination of the parts of the controller by which I am enabled to practice my improved method without expensive and complicated apparatus.

Figure 2:
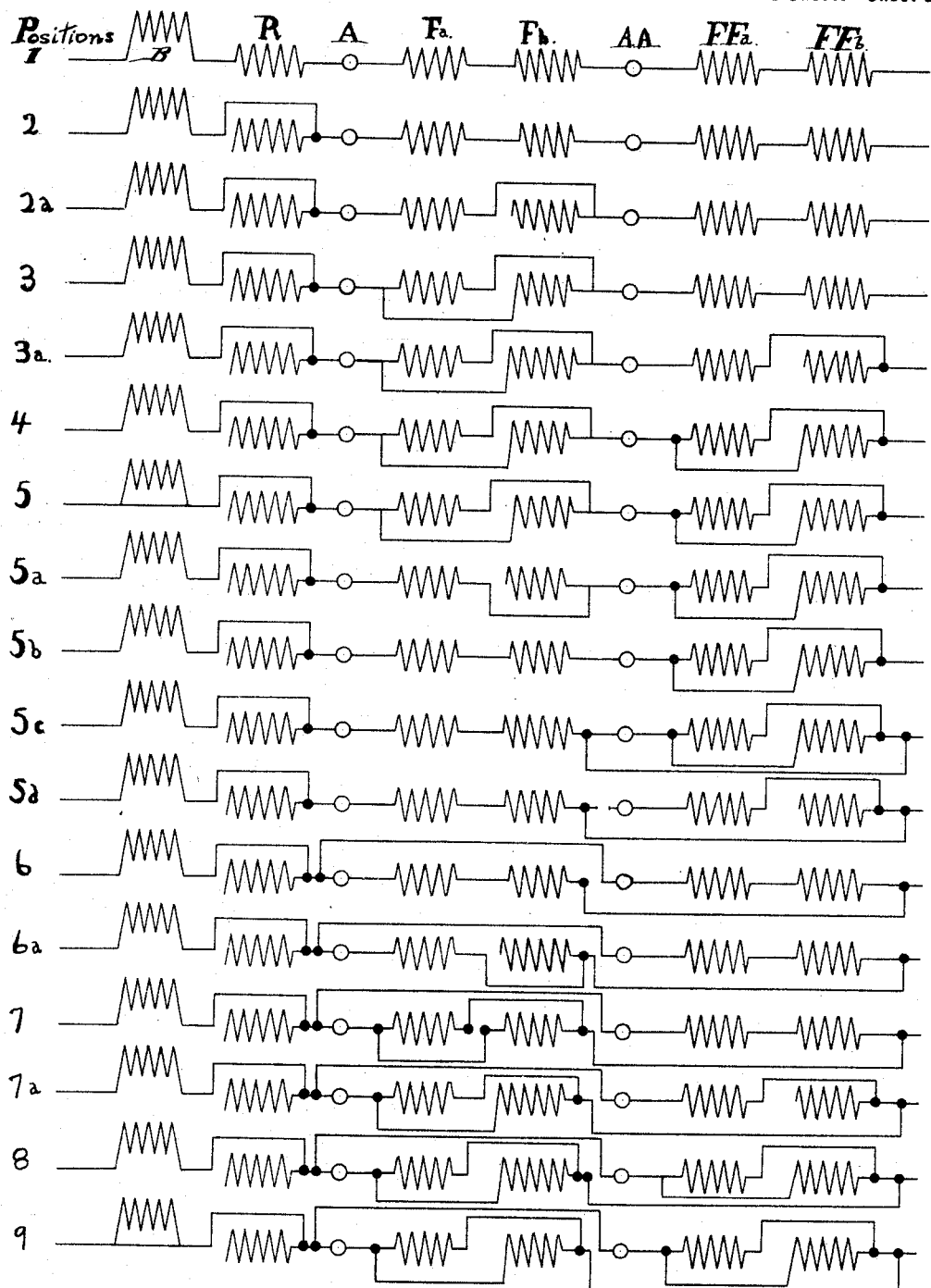

Referring to the drawings, Figure 1 is a diagram showing two motors, a controller, and such parts of the wiring and connections as are of value to illustrate the nature and mode of operation of my improved method. Fig. 2 shows the successive circuit connections made by the movement of the controlling-switch.

Referring first to Fig. 1, one side of the circuit is represented by the word "trolley," and this is connected through suitable canopy switches and other parts of the car-wiring to parts of the controller.

A and A A are the armatures of the two electric motors, A' and A² being conductors leading to armature A, while A A' and A A² are the corresponding conductors leading to armature A A.

F and F F represent the field coils of the two motors, which are wound with duplicate windings $F^a$ and $F^b$ for fields F, and $F\ F^a$ and $F\ F^b$ for fields F F.

F' and $F^2$ are conductors leading to the terminals of winding $F^a$. $F^3$ and $F^4$ are corresponding conductors leading to the terminals of winding A $F^b$.

F F′, and F F², F F³, and F F⁴ are conductors leading to the corresponding parts of the windings of field F F.

Squares 1 to 17, inclusive, represent a series of fixed contact-brushes which form part of the controlling-switch. The balance of the controlling-switch comprises a number of moving contacts—such, for instance, as contact-pieces mounted on a cylindrical drum adapted to be rotated by an operating-lever—divided into five groups. As this type of mechanical construction is old in the art I have only shown the contacts and their electrical interconnections in diagram. These movable contacts are represented by the rectangles 1ª, 1ᵇ, 2ª, &c., to 17ª, inclusive. These five groups are electrically disconnected from each other, although the members of each group are all connected together. One group is adapted to contact with brushes 1 to 5, inclusive, while each of the succeeding groups are adapted to contact with three of the contact-brushes.

B represents the coil of an electromagnetic arc-interrupter.

R represents an external resistance which I prefer to insert in circuit when the motors are first started from rest.

C represents a group of moving contacts forming part of a combined reversing and cut-out switch, brushes 18 to 25, inclusive, being adapted to coöperate with the contacts C. This switch and its connections form no part of the present invention and are only shown in order that a complete circuit may be traversed. For this purpose only part of the contacts C need be considered, and in tracing out the positions it will hereinafter be assumed that brushes 18 to 25 are engaging the four contacts C′, C², C³, and C⁴.

The brushes 1 to 15, which engage with the five groups of moving contacts of the control-switch, are connected as follows: brush 1 to trolley, brush 2 to R, brush 3 to trolley through the blow-out coil B, brush 4 to one end of R and to brush 18 of the reversing and cut-out switch, brush 5 to brush 22 of the reversing and cut-out switch and to brush 11 of the controlling-switch, brush 6 to brush 21 and to F′, brush 7 to brush 9 and to F², brush 8 to F³, brush 9 to brush 7 and F², brush 10 to F⁴ and brush 16, brush 11 to brush 5 and brush 22, brush 12 to brush 25 and F F′, brush 13 to brush 15 and F F², brush 14 to F F³, brush 15 to brush 13 and F F², brush 16 to brush 10 and F⁴, brush 17 to ground. These five groups of movable contacts form substantially five interconnected switches connected together and each having its own function to perform, smaller changes in circuit connections being made by one of the groups independently of the others, while larger changes are made by the interconnections between the different groups of brushes, as will be more fully understood after the different positions of the controlling-switch have been examined.

At the first position of the switch brushes 1, 4, 5, 6, 9, 12, 15, and 16 are not engaging any of the movable contacts, but brushes 2, 3, 7, 8, 10, 11, 13, 14, and 17 are in contact with 2ª, 3ª, 7ª, 8ª, 10ª, 11ª, 13ª, 14ª, and 17ª, respectively, and the course of the current (assuming brushes 18 to 25 are contacting with the contacts C′, C², C³, and C⁴, as before explained) will be as follows: from trolley through blow-out coil B, brush 3, contacts 3ª and 2ª, brush 2, resistance R, brush 18, contact C′, brush 19, conductor A², armature A, conductor A′, brush 20, contact C², brush 21, conductor F′, field-winding Fª, conductor F², brush 7, contacts 7ª and 8ª, brush 8, conductor F³, winding Fᵇ, conductor F⁴, brush 10, contacts 10ª and 11ª, brush 22, contact C³, brush 23, conductor A A², armature A A, conductor A A′, brush 24, contact C⁴, brush 25, conductor F F′, winding F Fª, conductor F F², brush 13, contacts 13ª and 14ª, brush 14, conductor F F³, winding F Fᵇ, conductor F F⁴ to ground. In this position, therefore, the current passes through the blow-out coil B, the artificial resistance R, and the armature and the field of both motors in series, the two windings of each field being also in series. This is shown in position 1 of Fig. 2. I prefer to use the resistance R at the first point, and even might take further resistance steps at this point, as the motors are without any counter electromotive force and therefore have only their ohmic resistances to cut down the current flow. This, however, might be dispensed with, if desired. It will be seen that in this first position the field-coils are arranged so that their ohmic resistance is at the maximum, and as the current flowing through the circuit will pass successively through both windings of each field the greatest possible number of ampere-turns are provided and the highest field strength is available at this position. Consequently the motors are in the best condition not only to prevent too great an inrush of current, but also to exert their greatest torque. At the next position of the controller brush 2 is disconnected from contact 2ª and brush 4 simultaneously engages contact 4ª. No other changes are made at this position, so that the course of the current is precisely the same as before, except that from contact 3ª the current passes through contact 4ª and brush 4 to brush 18 instead of through the contact 2ª, brush 2, and resistance R to the same. The only effect of this is, as shown in position 2 of Fig. 2, that the resistance R is cut out of circuit, for the motors having now started and acquired a counter electromotive force can be connected directly to the circuit, their high ohmic resistance and counter electromotive force combined being sufficient to prevent an undue increase in current flow. The next change in connections made by the movement of the controlling-switch is shown at position 2ª in Fig. 2 and is effected by the disengagement of brushes 7 and 8 from contacts $7^a$ and $8^a$ and the engagement between brush 9 and contact $9^a$. This effects a breaking of the series connection between the field-windings $F^a$ and $F^b$ and a connection directly between $F^a$ and the armature A A of the second motor. This is preferably a passover position which would not be used except while the handle is moving from position 2 to position 3. It gives a slightly-reduced ohmic resistance to the circuit, because the resistance of $F^b$ is no longer in circuit, and also somewhat weakens for the same reason the strength of the field F. The next position 3 connects the winding $F^b$ with armature A, so that the windings $F^a$ and $F^b$ are in parallel and the ohmic resistance of the circuit is still further decreased and the field F is still comparatively weak, so that it will tend to rotate armature A at a somewhat higher speed than it did at position 2. This change is effected by the engagement of brushes 6 and 8 with contacts $6^a$ and $8^b$. The next position, which is preferably another passover position, is shown at $3^a$. Here winding F $F^b$ is disconnected from winding F $F^a$ by the disengagement of brushes 13 and 14 from contacts $13^a$ and $14^a$, and winding F $F^a$ is connected with the ground side of the circuit by the engagement of brush 15 with contacts $15^a$. This position still further tends to accelerate the motors by affecting the field-circuit of F F in the same manner as position $2^a$ affected the field-circuit F. Position 4 bears the same relation to $3^a$ as position 3 to position $2^a$, the change being effected by the engagement of brushes 12 and 14 with contacts $12^a$ and $14^b$. The two motors are now in series with each other, the field-winding of each motor being in multiple with each other, so that the ohmic resistance of the circuit and the strength of the fields is at the lowest. Position 5 only varies from position 4 in that by engagement of brush 1 with contact $1^a$ the blow-out coil B is short-circuited. Positions $5^a$, $5^b$, $5^c$, and $5^d$ are intermediate positions preparatory to changing the motors from series to multiple relation. In position $5^a$ the field-windings $F^b$ are first cut out and then connected in series with each other, this result being again effected by the changes in the relation of brushes 6, 8, and 9 with contacts $6^a$, $8^b$, and $9^a$. At $5^c$ brush 16 engages contact $16^a$, by which a shunt is thrown about one motor, $F^b$ being connected to ground. At position $5^d$ windings $F^a$ and $F^b$ are shifted preparatory to placing them in series with each other, this shifting being accomplished by the disengagement of brushes 12 and 14 from contacts $12^a$ and $14^b$, and simultaneously armature A A is disconnected from its series relation by the disengagement of brush 11 and contact $11^a$. These positions $5^a$, $5^b$, $5^c$, and $5^d$ are all preferably passover positions.

The first multiple position is position 6, in which, without inserting any external resistance, armature A A is connected with the trolley side by engagement between brush 5 and contact $5^a$. Simultaneously the series connection is completed between F $F^a$ and F $F^b$ by engagement of brushes 13 and 14 with contacts $13^b$ and $14^c$. The two motors are now in multiple with each other, and as this would tend to cause a very sudden acceleration the field-coils of the motors are arranged with their greatest strength so as to increase the counter electromotive force of the motors, the same arrangement also giving the highest ohmic resistance of each motor. Position $6^a$ is a temporary position and effects the same changes as were effected by position $2^a$, and of course effects these changes by means of the same brushes and contacts. Position 7 effects the same change as was effected by position 3, position $7^a$ the same as that effected by position $3^a$, position 8 the same as that effected by position 4, and position 9 the same as that effected by position 5—that is to say, the positions $6^a$, 7, $7^a$, 8, and 9 while retaining the motors in multiple vary by successive steps the field-circuit of first one motor and then the other, finally short-circuiting the blow-out coil B in precisely the same manner as was done in positions 2 to 5 while the motors were retained in series.

It will be seen that without undue complication of parts I am enabled by my improved method and apparatus to gradually accelerate the motors without undue complication of motor-circuits and without wasting any substantial current in dead or artificial resistances. However, it is of course obvious that I might in connection with my invention also use resistances where conditions make it desirable and suitable.

It will be seen that the apparatus which I have provided to effect the various changes of circuits is composed substantially of five groups of movable contacts, the contacts of each group being all electrically connected, but the contacts of different groups being disconnected from each other. The first of these five groups (including contacts $1^a$ to $5^a$) controls the external circuit—that is, the blow-out coil and resistance—and establishes a multiple relation of the motors. For brevity this may be called the "external circuit and multiple switch." The second of these groups (including contacts $6^a$ to $8^d$) effects series multiple changes of field-windings $F^a$ and $F^b$ and is therefore a field-switch for field F. The third of these groups (including contacts $9^a$ to $11^a$) serves the purpose of maintaining the series connection between the motors (armature A A and the field-windings of field F) for the series positions of the controller and also controls the point of connection of the ground side of the first motor (field F) when the motors are broken from series connection. This third group therefore, with the brushes which engage it, may be appropriately termed the "switch" for shifting the intermediate terminals of the motors, so as to complete the new circuit arranged for by the balance of the switches, or, more briefly, a circuitcompleting switch. The fourth group (including contacts 12ª to 14ᵇ) is a switch similar to the second group, but controlling the field-windings F Fª and F Fᵇ of field F F. The fifth group (including contacts 15ª to 17ª) is a ground-switch, as it comes into play to connect to ground when necessary any of the parts of the circuit which are not permanently connected to ground F F⁴. I believe by this arrangement that I have with a minimum of of contacts and without any complexity presented a switch in which there are no difficult insulation problems and which can be constructed at a moderate cost.

I do not desire to limit myself to immaterial details, such as the arrangement of the blow-out coil and resistance R, for these are not essential to the scope of my invention as set forth in the appended claims and might readily be dispensed with or modified by any one skilled in the art. Many other minor details fall in the same category, and while I lay claim to the apparatus herein shown and described I am not limited to this apparatus in the practice of my method of control.

Having thus described my invention, what I claim, and desire to protect by Letters Patent, is—

1. The method of accelerating a plurality of motors consisting in changing the circuit relations between the said motors, and during the period at which the motors are in a given circuit relation with each other decreasing the field strength and ohmic resistance of first one motor and then another motor.

2. The method of accelerating two electric motors having a plurality of field-windings consisting in effecting small differences in acceleration by changing the field-circuit of one motor without altering that of the other, larger differences by changing the field-circuits of both motors, and still larger differences by changing the circuit relations between the two motors.

3. The method of accelerating two electric motors having a plurality of field-windings consisting in starting the two motors in series with each other and with their maximum field strength and ohmic resistance, then by successive steps decreasing the field strength and ohmic resistance of the first motor without altering the circuit through the second motor, then by successive steps decreasing the field strength and ohmic resistance of the second motor, then again increasing by successive steps the field and ohmic resistance of one of the motors, then placing the motors in parallel with their maximum field strength and ohmic resistance, and then by similar successive steps decreasing the field strength and ohmic resistance of first one motor and then the other, finally having the motors in multiple with their minimum field strength and ohmic resistance.

4. The method of accelerating two electric motors which consists in starting them in series with each other and with their field strength and ohmic resistance, at the maximum, then, by successive steps, decreasing the field strength and ohmic resistance of first one motor and then the other motor, then changing the motors to multiple relation by intermediate steps which again restores the maximum field strength and ohmic resistance of each motor, and then again lowering by successive steps the field strength and ohmic resistance of first one motor and then the other until both are in multiple with the field strength and ohmic resistance of each at the minimum.

5. The method of accelerating two electric motors having a plurality of field-windings which consists in starting the two motors in series with each other and with the field-windings of each in series, then cutting out one field-winding of one motor, then reinserting it in parallel with the other field-winding of the said motor, then shifting the field-windings of the second motor by similar steps, then retracing said steps on the first motor, then shunting the second motor, then cutting out one field-winding of the second motor, then placing the field-windings of the second motor in series and the two motors in multiple, and finally, by a series of similar intermediate steps, placing the field-windings of each motor in parallel without changing the multiple relation of the two motors.

6. The method of shifting two motors from series to parallel relation consisting of strengthening the field and ohmic resistance of one motor, then placing a shunt around the other motor and then placing said shunted motor, with its field strength and ohmic resistance increased, in parallel with the first-mentioned motor.

7. The combination with a pair of electric motors having a plurality of field-windings, of a controlling-switch adapted to shift the motors from series to multiple and contacts on said switch arranged to change the field-windings of one motor from parallel to series before changing the motors from series to parallel and other contacts arranged to place a shunt around the other motor, preliminary to placing it in parallel with the first-mentioned motor.

8. The combination with two electric motors having a plurality of field-windings and a switch for changing the motors from series to parallel, of brushes 7, 8, 13, 14 and 16 connected to the field-windings of the motors, brush 17 connected to the ground side of the circuit and contacts 7ᵇ, 8ᶜ, 13ᵇ, 14ᶜ, 16ª and 17ª connected together and with the brushes substantially as set forth, whereby the change from series to parallel is made gradually.

9. The combination of a plurality of electric motors, a switch for connecting the motors in different circuit relations with each other, and adapted, while retaining the motors in the same circuit relation with each other, to vary the field strength and ohmic resistance of either motor without affecting that of any other motor.

10. The combination with two electric motors, their armatures and sectional field-coils, of a controlling-switch comprising a series of brushes in connection with the working circuit, and a plurality of movable contacts adapted to engage the brushes and connect the same in a plurality of ways, part of said movable contacts being adapted to connect the brushes so as to place the motors in series relation and part being adapted to place the motors in multiple relation with each other, the series and multiple contacts being each subdivided into successive steps each of which is adapted to alter that part of the circuit composed of the field-coils of one motor without affecting the circuit through the other motor.

11. In an apparatus for controlling a plurality of electric motors having a plurality of field-windings, a controlling-switch comprising the combination of an external circuit and multiple switch, field-switches for each motor, a motor terminal switch, and a ground-switch connected together so as to coöperate in changing the path and intensity of the current through the motors.

12. The combination with the armatures and sectional field-coils of two electric motors, of a switch for controlling the path of the current through the changeable parts of the circuit external to the motors and for placing the motors in multiple, two switches for separately series-paralleling the field-coil sections of the two motors, a switch for temporarily grounding portions of the motor-circuit, and a switch for shifting the terminals of the motors to complete the new circuit arranged for by the remaining switches, all five of said switches being connected so as to act together substantially as set forth.

In testimony whereof I have affixed my signature in presence of two witnesses.

W. MILT. BROWN.

Witnesses:
  RICHARD EYRE,
  H. W. SMITH.